Figure 4:
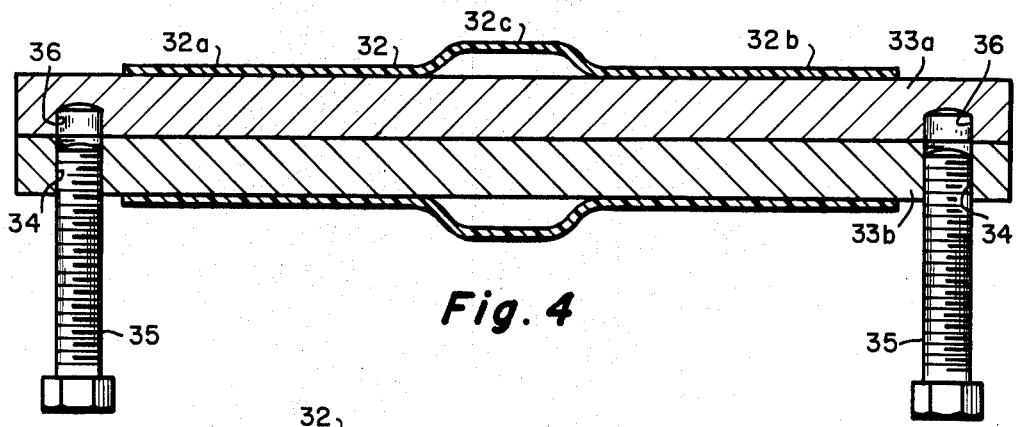

Jan. 4, 1966  J. M. YOST  3,227,174
VALVE AND METHOD OF MAKING IT
Filed April 30, 1963  2 Sheets-Sheet 1
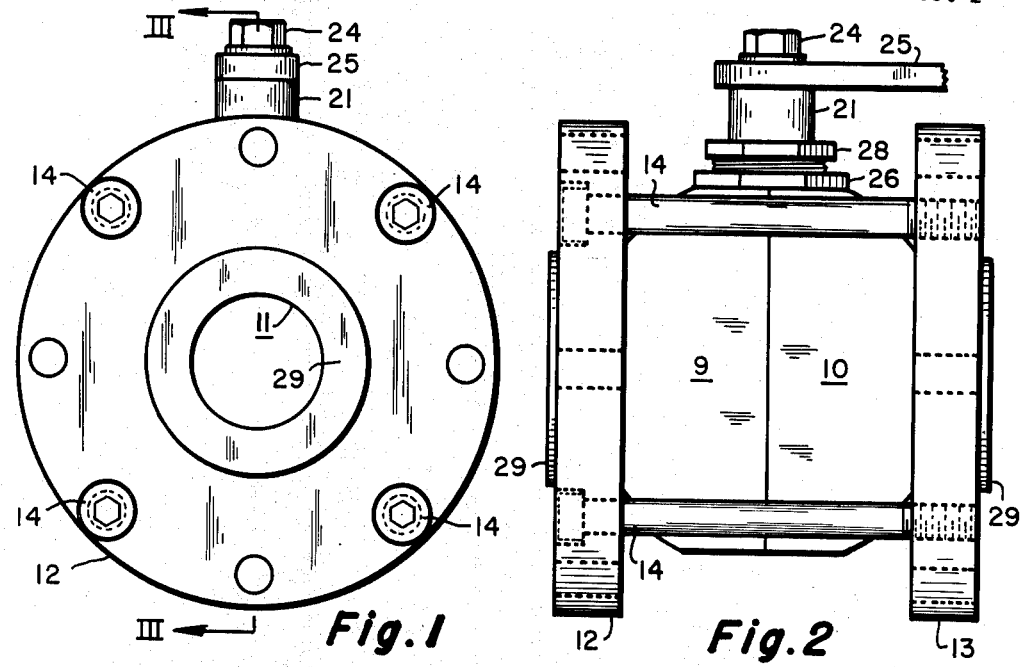
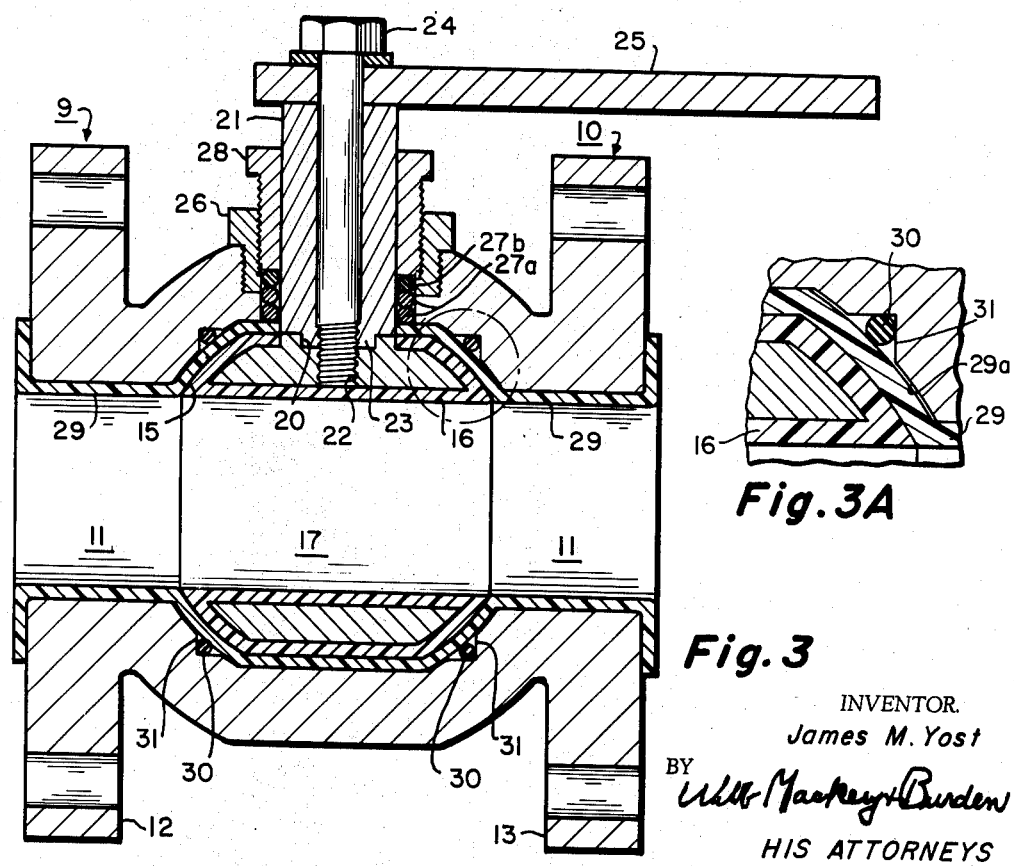
INVENTOR.
James M. Yost
BY
HIS ATTORNEYS Jan. 4, 1966   J. M. YOST   3,227,174
VALVE AND METHOD OF MAKING IT
Filed April 30, 1963   2 Sheets-Sheet 2

INVENTOR.
James M. Yost
BY
*Abbt Mackey & Burden*
HIS ATTORNEYS

United States Patent Office 3,227,174
Patented Jan. 4, 1966

3,227,174
VALVE AND METHOD OF MAKING IT
James M. Yost, Sewickley Heights, Pa., assignor to Allegheny Plastics, Inc., Coraopolis, Pa.
Filed Apr. 30, 1963, Ser. No. 276,960
12 Claims. (Cl. 137—375)

This application relates to a valve and method of making it, more particularly a valve for controlling the flow of highly corrosive fluids at relatively high temperatures and pressures.

A long outstanding industrial problem has been the control of highly corrosive fluids, particularly the control of such fluids under high pressures and at high temperatures. A wide variety of valve designs have been proposed employing a wide variety of materials, notably stainless steel. Stainless steel valves, however, are expensive, and even such steels will not withstand some corrosive fluids for a satisfactory length of time. Valves have also been made entirely of polytetrafluoroethylene, which is noted for its resistance to substantially every corrosive material, but such valves cannot be used where high temperatures and pressures are involved. Valves having polytetrafluoroethylene components in association with metal parts also cannot be used under these conditions. This material is particularly unsuitable for applications where there are temperature variations because its coefficient of thermal expansion is much greater than that of common metals and it tends to "cold set," that is, after it has expanded due to a rise in temperature, it will not return to its former size upon a reduction in temperature. Therefore, a valve of polytetrafluoroethylene which has been heated will leak when the temperature returns to its former value, because the valve will have expanded upon a rise in temperature but will not return to its former size upon cooling.

The valve which I have invented utilizes the chemical inertness of polytetrafluoroethylene (herein referred to as PTFE for brevity), and, at the same time, avoids its defects. My valve can be used to control the flow of fluid under relatively high pressures (in the order of 500 pounds per square inch) and at relatively high temperatures (in the order of 500° F.). I have also invented a method of making the valve in which a property of PTFE known as "plastic memory" is used.

As stated above, my valve is intended primarily to take advantage of the chemical inertness of PTFE, and, therefore, it will be described with reference to PTFE. However, other plastics which are corrosion resistant and fluid-impervious and which have the property known as "plastic memory" may be used. Thus, other fluorocarbon polymers may be used as the liner, as for example, copolymers of tetrafluoroethylene with other unsaturated organic compounds, such as ethylene and chlorotrifluoroethylene. Other suitable fluorocarbon polymers include polychlorotrifluoroethylene, sold under the trademark Kel-F, and various copolymers of chlorotrifluoroethylene. In addition to fluorocarbon polymers, the lining and ball may be formed of such synthetic organic plastics as polyethylene, polypropylene, vinyl polymers such as polyvinyl chloride, and the like.

Preferably, the synthetic organic material has a low coefficient of friction in addition to resistance to chemical attack.

Figure 5:
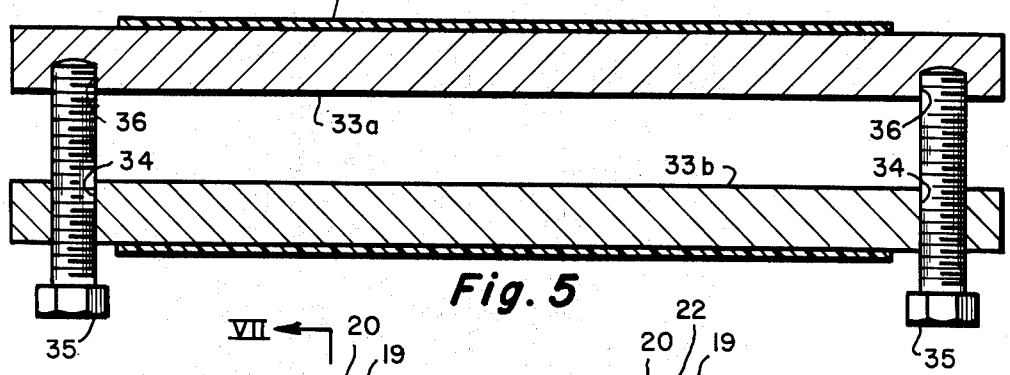
Figure 6:
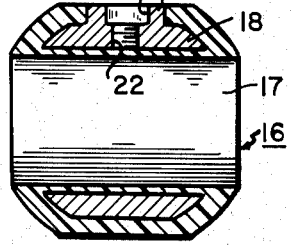
Figure 7:
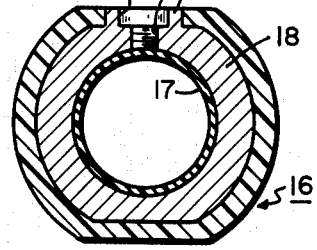
Figure 8:
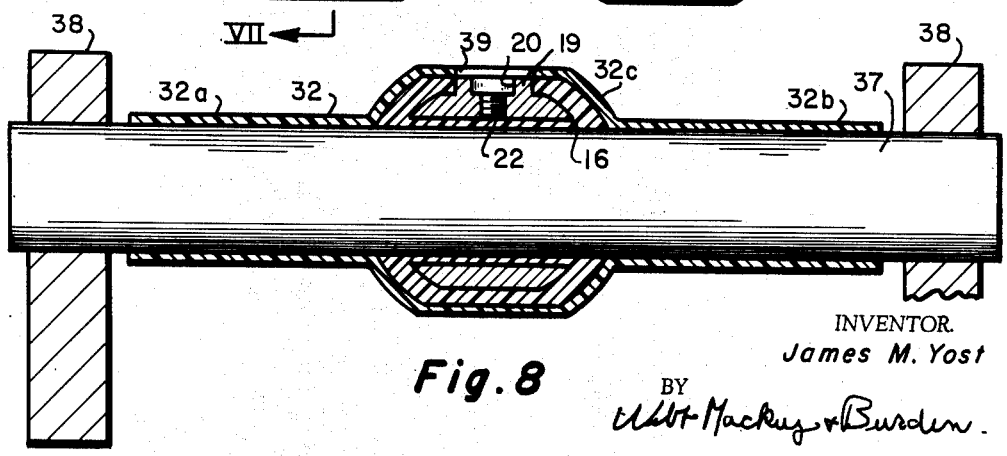

In the accompanying drawings, I have illustrated presently preferred embodiments of my invention in which:
FIGURE 1 is an end view of the valve;
FIGURE 2 is a side view of the valve;
FIGURE 3 is a section along the line III—III in FIGURE 1;
FIGURE 3A is an enlarged view of the portion of FIGURE 3 included within the chain line circle in FIGURE 3;
FIGURES 4 and 5 are sections illustrating the steps in the manufacture of the valve;
FIGURE 6 is a longitudinal section of a valve ball used in the valve;
FIGURE 7 is a section along the line VII—VII of FIGURE 6; and
FIGURE 8 is a section illustrating another step in the manufacture of the valve.

Referring to the drawings, the valve has a housing made of two similar half sections 9 and 10 which join along a line extending at right angles to a flow passage 11 through which fluid flows through the valve. The outer ends of the half sections have flanges 12 and 13 whereby the valve can be connected to flanged pipe. The two half sections are held together by bolts 14 which pass through holes in the flange 12 and are threaded into the flange 13.

A valve chamber 15 within the housing intersects the flow passage 11. This valve chamber is generally spherical in shape to receive a valve ball 16 having a diameter larger than the diameter of the flow passage 11. The valve ball 16 has a diametrically extending flow passage 17 through which fluid flows through the valve. FIGURE 3 shows the valve open position in which the flow passage 17 is in line with the flow passage 11 of the housing. It is closed by turning the valve ball to a position 90° from the position shown in FIGURE 3.

The valve ball member 16 is shown in FIGURES 6 and 7. It is made of PTFE and is generally spherical, except that, as shown in FIGURE 6, the top and bottom of the ball are flattened to save material. For strength, it has a metal insert 18, and this insert has a boss 19 in which a slot 20 is formed to key a valve stem 21 (see FIGURE 3). The insert 18 has a threaded bore 22 beneath the slot 20 to secure the stem to the insert, as is later explained. The valve ball 16 is made by molding PTFE around the insert.

Referring to FIGURE 3, the valve stem 21 has a tongue 23 which fits in the slot 20 in the insert 18 of the valve ball, and a bolt 24 passes through the stem and threads into the threaded bore 22 in the insert 18 of the valve ball to secure the valve stem 21 to the valve member. The bolt 24 also secures a handle 25 to the valve stem. The stem passes through a bushing 26 threaded into an opening in the top of the housing and is sealed by packing 27a and 27b and a gland nut 28, which is threaded into the bushing 26 and presses the O-rings against a PTFE sleeve 29 which surrounds the valve ball 16. The packing may comprise a PTFE ring 27a backed up by a silicone rubber ring 27b which resiliently presses the ring 27a against the sleeve 29.

A PTFE sleeve 29 lines the entire length of the flow passage 11 and fits tightly around the valve ball 16. It is also spun or coined over at the outer ends of the flow passage 11 to cover at least a part of the end faces of the flanges 12 and 13. The valve ball, the valve chamber 15 and the sleeve 29 are dimensioned so that there is a slight clearance 29a (e.g. .010 to .030 inch depending on the size of the valve) between the sleeve and the walls of the valve chamber. This clearance is necessary because the coefficient of thermal expansion of PTFE is much higher than that of the metal of which the housing is made.

Two O-rings 30 are positioned in grooves 31 cut in the walls of the valve chamber. These O-rings are on opposite sides of the valve ball 16 and surround its flow passage 17 when the valve is in open position. The O-rings are of resilient material such as a silicone rubber and are of such size that they resiliently press the sleeve 29 against the valve ball and thereby provide an effective seal between the sleeve 29 and the valve ball when the valve is in the closed position. Since the O-rings are of resilient material, they allow for thermal expansion of the valve ball and of the PTFE sleeve 29 simply by being deformed into the unfilled portion of groove 31. When the temperature of the valve decreases, the O-rings press the sleeve 29 against the valve ball and thereby overcome the tendency of PTFE to "cold set" in its thermally expanded shaped. Thus, the O-rings maintain a tight seal between the valve ball and the PTFE sleeve, even though these parts are subjected to changes in temperature.

Referring to FIGURE 3, it will be seen that fluids passing through the valve or shut off by the valve come in contact only with PTFE surfaces. No material subject to corrosion is exposed to fluid flowing through the valve. Therefore, the valve can be used to control the flow of corrosive fluids indefinitely, and a tight seal is maintained even though the valve is subjected to temperature variations.

An important result arises from the fact that the PTFE sleeve fits tightly around the valve ball. In prior ball valves there has existed a dead space between the valve ball and the ball chamber into which fluid trapped in the passage in the ball when the valve was closed would flow. In certain instances the fluid accumulated in the dead space has gassified and exploded, and in other instances it has crystallized and the crystals have damaged the valve. Because the PTFE sleeve fits tightly around the valve ball in my valve no dead space exists.

FIGURES 4, 5 and 8 show a part of the procedure for and apparatus used in making the valve. The chief problem in making the valve is inserting the valve ball 16 in the PTFE sleeve 29. After this is done, all that is required is the bolting together of the two housing half sections, the attachment of the valve stem 21, and the forming of the ends of the liner over the flanges.

A sleeve blank 32 is first formed by machining PTFE tubing. As shown in FIGURE 4, the sleeve blank 32 is generally similar in shape and dimensions to the sleeve in the finished valve. The two end portions 32a and 32b have slightly smaller inside diameters than the corresponding portions in the finished sleeve to overcome any possible permanent deformation in these portions of the blank due to stretching of the blank as described below. The central portion 32c is slightly smaller both in diameter and in length than the portion of the finished sleeve which surrounds the valve ball in the finished valve. For example, if the inside diameter of the central portion of the sleeve which surrounds the valve balls is 1¾ inches, then the inside diameter of the portion 32c of the sleeve blank 32 will be 1⅜ inches. The sleeve blank is then placed in an oven and heated to a temperature such that it can be stretched to an extent that upon cooling the valve ball can be inserted into it and such that, upon subsequent heating, the liner, due to plastic memory, will shrink down around the valve ball and bar 37. This temperature will vary with the material being used for the sleeve. For PTFE the temperature ranges between approximately 430° and 470° F. After the blank has been heated to the proper temperature, it is stretched so as to increase its diameter.

FIGURES 4 and 5 show one way in which the sleeve blank can be stretched to increase its diameter. The sleeve blank is placed over two semicylindrical bars 33a and 33b. The bar 33b has threaded bores 34 into which bolts 35 are threaded. The bar 33a has shallow bores 36 which receive the ends of the bolts 35 when they are threaded through the bar 33b. As shown in FIGURE 5, the sleeve blank 32 is stretched by turning the bolts 35 to separate the semicylindrical bars 33a and 33b. The sleeve is stretched until it has an inner diameter which is large enough that the valve ball 17 can be passed through it.

The valve ball (without the valve stem secured to it), is placed over a cylindrical bar 37 (see FIGURE 8) and the bar and the valve ball are slipped into the stretched sleeve, the valve ball being centered lengthwise in the sleeve blank. The assembled bar 37, sleeve blank 32 and valve ball 17 are placed in an oven and heated to such a temperature that because of plastic memory, the sleeve will shrink tightly around the ball and the bar. The temperature to which the sleeve is heated in order to make plastic memory effective in shrinking the seleve varies with the material of the sleeve. For PTFE the temperature ranges between approximately 700° and 730° F. Because the original size of the central portion 32c of the sleeve was made smaller than the internal diameter of that portion when it surrounds the valve ball, the sleeve makes a tight fit around the valve ball.

As shown in FIGURE 5, the rod 37 is longer than the sleeve blank 32, and the sleeve blank is placed on the rod so that the rod protrudes from each end of the sleeve. When the sleeve blank and valve ball are reheated to shrink the sleeve, they are kept off the floor of the oven by supports 38 which engage the protruding ends of the rod.

After the sleeve blank has shrunk to its final shape, it is removed from the oven and allowed to cool. An opening 39 is cut in the sleeve so that the valve stem 21 can be secured to the valve ball. The two housing half sections 9 and 10 with the rings 30 in the grooves 31 are placed around the sleeve and valve ball and bolted together as shown in FIGURE 2. The bushing 26 is threaded into the housing and the stem 21 on it is inserted in the slot 20 in the valve ball. The packing 27a and 27b is put in place and clamped with the gland nut 28. The bolt 24 is passed through the handle 25 and the stem 21 and threaded into the bore 22 in the insert of the valve ball.

The sleeve is made longer than the flow passage 11 of the valve so that it protrudes beyond the end faces of the flanges 12 and 13. The protruding ends of the sleeve are coined and spun against the end faces of the flanges so that, as shown in FIGURES 1 and 3, they cover at least a portion of these end faces.

Because PTFE has such a low coefficient of friction, my valve can be operated for long periods of time without substantial wear. If, however, the sleeve and ball eventually wear to the extent that the valve leaks, they can be readily replaced by a new sleeve and ball assembly such as shown in FIGURE 8.

While I have described certain presently preferred embodiments of my invention, it is to be understood that it may be otherwise variously embodied within the scope of the appended claims.

I claim:
1. A valve comprising,
   (A) a housing,
   (B) a flow passage extending through the housing,
   (C) a valve chamber intersecting said flow passage,
   (D) a valve ball having a diameter larger than the diameter of the flow passage of corrosion resisting material rotatably mounted in the chamber and having a diametrically extending flow passage whereby the valve is opened and closed by rotation of the ball valve in the chamber,
   (E) a valve stem secured to said valve ball and extending through the housing for turning said ball valve,
   (F) a single continuous sleeve for corrosion resisting material within and extending the full length of said flow passage and through said chamber and having a central portion in contact with substantially all of the outer surface of said valve ball except for the valve stem, and
   (G) rings of resilient material
      (1) positioned in the walls of said chamber beneath said sleeve and on opposite sides of said valve ball and surrounding the flow passage in said member when it is in open position and
(2) resiliently pressing said sleeve against the valve ball.

2. A valve as described in claim 1 in which the housing and the sleeve are dimensioned to provide a slight clearance between the sleeve and the housing.

3. A valve as described in claim 1 in which the housing is composed of two half sections meeting on a line extending transversely of the flow passage through the housing and bolted together.

4. A valve as described in claim 1 in which said corrosion resisting material is a synthetic organic plastic having a low coefficient of friction.

5. A valve as described in claim 1 in which said corrosion resisting material is a fluorocarbon polymer.

6. A valve as described in claim 1 in which said corrosion resisting material is polytetrafluoroethylene.

7. A valve as described in claim 1 in which said corrosion resisting material is polyethylene.

8. A sub-assembly for a ball valve having a housing, a flow passage through the housing and a valve chamber intersecting the passage, said sub-assembly comprising:
  (A) a one-piece continuous sleeve of corrosion resisting material having
    (1) a central portion larger in internal diameter than its end portions, and
    (2) a length at least equal to said flow passage, and
  (B) a ball of corrosion resisting material
    (1) positioned within the enlarged central portion of said sleeve, and
    (2) having a portion of its surface adapted to secure a valve stem to the ball,
    (3) substantially all of the outer surfaces of said ball except for the valve stem portion engaging the inside wall of said enlarged sleeve portion,
    (4) said ball also having a diametrically extending flow passage.

9. A sub-assembly for a ball valve as described in claim 8 in which the corrosion resisting material for the sleeve and ball is polytetrafluoroethylene.

10. A sub-assembly for a ball valve as described in claim 8 in which the corrosion resisting material for the sleeve is a synthetic organic plastic having plastic memory.

11. A sub-assembly for a ball valve as described in claim 8 in which the corrosion resisting material for the sleeve is a synthetic organic plastic having a low coefficient of friction.

12. A sub-assembly for a ball valve as described in claim 8 in which the corrosion resisting material is a fluorocarbon polymer.

References Cited by the Examiner

UNITED STATES PATENTS

| | | | |
|---|---|---|---|
| 536,184 | 3/1895 | Case | 264—230 |
| 2,027,962 | 1/1936 | Currie | 264—230 |
| 2,617,151 | 11/1952 | Rubin | 264—127 |
| 2,899,710 | 8/1959 | Hendry | 264—127 |
| 3,011,219 | 12/1961 | Williams | 264—127 X |
| 3,073,336 | 1/1963 | Johnson | 137—375 |
| 3,082,485 | 3/1963 | Thomas | 264—127 X |
| 3,103,948 | 9/1963 | Salmen | 137—375 |
| 3,111,325 | 11/1963 | Reiling | 264—127 X |
| 3,148,896 | 9/1964 | Chu | 137—375 X |

M. CARY NELSON, *Primary Examiner.*

HENRY T. KLINKSIEK, *Assistant Examiner.*